UNITED STATES PATENT OFFICE.

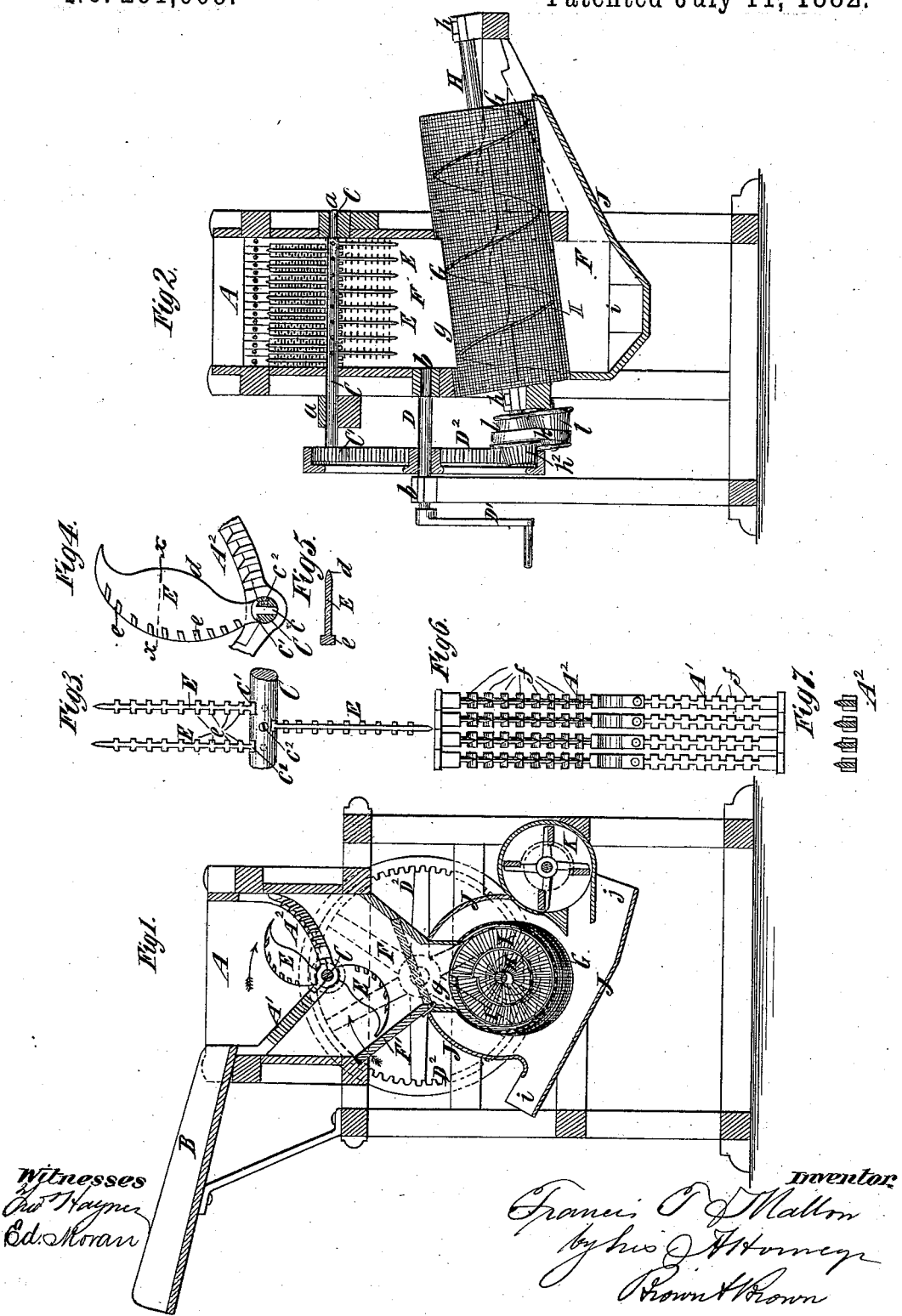

FRANCIS T. MALLON, OF PAWCATUCK, CONNECTICUT.

MACHINE FOR SHELLING PEAS AND BEANS AND CUTTING VEGETABLES.

SPECIFICATION forming part of Letters Patent No. 261,009, dated July 11, 1882.

Application filed April 21, 1882. (No model.)

*To all whom it may concern:*

Be it known that I, FRANCIS T. MALLON, of Pawcatuck village, in the town of Stonington, county of New London, and State of Connecticut, have invented a certain new and Improved Machine for Shelling Peas and Beans and Cutting Vegetables, of which the following is a specification.

The object of my invention is to provide a simple and convenient machine for the use of farmers for shelling dry or ripe peas or beans, the stalks or vines, with the peas attached, being fed into the machine, and which may be used for cutting roots or vegetables for feeding stock.

The invention consists in the combination, in such a machine, of a rotary shaft, curved or hooked knives or blades carried by said shaft and provided rearward of their cutting-edges with lateral projections, and a grating between the bars of which said knives or blades are adapted to move, and which bars are preferably provided with lateral projections, between which the lateral projections on the knives or blades pass as said knives or blades are rotated between the bars of the grating.

The above-described grating may form the inclined or converging bottom walls of the hopper, and the bars of the grating on one side of the shaft may have sharpened edges, as also may the lateral projections on said bars.

In the accompanying drawings, Figure 1 represents a vertical section of my improved machine. Fig. 2 represents a vertical section thereof in a plane at right angles to the plane of Fig. 1. Fig. 3 represents a side view of a portion of the shaft, with attached knives or blades, upon a larger scale. Fig. 4 represents a transverse section of the shaft and side view of an attached knife or blade on the scale of Fig. 3. Fig. 5 represents a section of one of the knives or blades on the dotted line $x\ x$, Fig. 4. Fig. 6 represents a plan of a portion of the grating upon the same scale as the last preceding figures, and Fig. 7 represents a transverse section of said grating.

Similar letters of reference designate corresponding parts in all the figures.

A designates a hopper, into which materials are delivered from a feeder or chute, B, and the bottom of which is composed of a grating, A' A², the two portions of which are inclined toward each other, or converge, as shown in Fig. 1.

Between the portions A' A² of the grating is a shaft, C, which extends from end to end of the grating, and is supported in suitable external bearings, $a$, as shown in Fig. 2.

D designates a driving-shaft mounted in bearings $b$, and adapted to be rotated by a handle or crank, D', if the machine is to be worked by hand, or by a belt over a pulley if the machine is to be worked by power.

Upon the driving-shaft D is a gear-wheel, D², engaging with a pinion, C', on the shaft C, and by turning the driving-shaft D said shaft C may be rotated at a quick speed.

E designates knives or blades carried by the shaft C, and which may be secured thereon at a little distance apart in any suitable manner. In this example of my invention the knives or blades have shanks $c$ inserted through the shaft C, and curved flanges $c'$, which project laterally therefrom and fit in recesses in the shaft, and said knives or blades may be secured by screws $c^2$, inserted transversely through the shaft and shanks, or in any other suitable manner. The knives or blades E are curved or hooked, as shown in Figs. 1 and 4, and $d$ designates their cutting-edges. Rearward of the cutting-edges, and in this instance at the back, the knives or blades are provided with lateral projections $e$.

The shaft C is always rotated in the direction indicated by the arrow in Fig. 1, and the knives or blades pass upward between the bars of the portion A' of the grating and downward between the bars of the portion A².

The bars of both portions of the grating may be provided with lateral projections $f$, between which the projections $e$ of the blades or knives pass, and the bars of the portion A² of the grating and their projections $f$ have sharp upper edges, as best shown in Fig. 7.

If the machine is to be used for shelling ripe peas or beans, the vines or stalks are fed into the hopper, and by the curved or hooked knives or blades the vines or stalks are broken and the pods are cut and torn sufficiently to discharge their contents.

If the machine is to be used for cutting roots or vegetables, they are placed in the hopper A, and, by the knives or blades E passing downward through the portion A² of the grating, are cut up and so finely divided as to pass through the grating.

Below the grating A' A² is a receptacle or chamber, F, which receives the materials passed through the grating, and if roots or vegetables are to be cut one of the sides, F', of said receptacle or chamber, which is hinged at the lower edge, is swung inward into the position shown in dotted lines in Fig. 1, so as to form an exit-opening for the cut roots or vegetables.

Below the receptacle F is a stationary cylindric screen, G, composed of wire-cloth and placed in an inclined position, as shown in Fig. 2. This screen is closed at the lower end, but is open at upper end, and from the receptacle F the peas or beans, together with pods or vines or stalks, are all delivered through a spout or chute, $g$, into the cylindric screen G.

H designates a shaft extending through the screen G, and mounted in bearings $h$ beyond the ends thereof. This shaft has upon it a pinion, $h^2$, engaging with the driving-wheel $D^2$, whereby it is rotated; and secured to the shaft within the cylindric screen G is a spiral screen, I, of reticulated material, secured upon the shaft in the form of a screw-thread.

The rotation of the spiral screen I tends to carry all materials entering the screen G upward and out at the higher end, and all vines, stalks, pods, &c., are thus carried up and discharged, while the shelled peas and beans drop back through the meshes of the spiral screen I, and then through the meshes of the cylindric screen G.

The screen G is inclosed in a casing, J, the bottom of which is inclined toward the lower end of the screen, as shown in Fig. 2, and at said lower end the casing is provided with an exit-opening, $i$, and is inclined downward to an opposite opening, $j$.

In the casing J is a fan-blower, K, which may be operated from the screen-shaft H by means of a belt, $k$, passing over reversely-coned pulleys or drums $l$, and as the peas and beans fall from the cylindric screen the blast of air carries away all light particles of vines, stalks, and pods and all other light refuse through the opening $i$, while the winnowed peas or beans are delivered through the opening $j$ into any suitable receptacle.

The construction and combination of the screens form the subject of another application for Letters Patent filed April 21, 1882, and the serial number of which is 59,060.

What I claim as my invention, and desire to secure by Letters Patent, is—

1. In a machine for shelling peas or beans and cutting vegetables, the combination of a rotary shaft, curved or hooked knives or blades secured thereto and provided rearward of their cutting-edges with lateral projections, and a grating, between the bars of which the said knives or blades work, substantially as herein described.

2. The combination of the grating A' A², the bars of which are provided with lateral projections $f$, the shaft C, and the hooked knives or blades E, provided with lateral projections $e$, substantially as herein described.

3. The combination of the grating A' A², composed of bars having projections $f$, the bars and projections of the part A² having sharp edges, the shaft C, and the hooked knives or blades E, provided with projections $e$, substantially as herein described.

FRANCIS T. MALLON.

Witnesses:
OWEN McGOWAN,
PHILIP J. A. BINDER.